(12) United States Patent
Arie et al.

(10) Patent No.: US 11,494,422 B1
(45) Date of Patent: Nov. 8, 2022

(54) FIELD PRE-FILL SYSTEMS AND METHODS

(71) Applicant: INTUIT INC., Mountain View, CA (US)

(72) Inventors: Aviv Ben Arie, Tel Aviv (IL); Omer Zalmanson, Tel Aviv (IL); Ido Meir Mintz, Tel Aviv (IL); Yair Horesh, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/809,523

(22) Filed: Jun. 28, 2022

(51) Int. Cl.
*G06F 16/332* (2019.01)
*G06F 40/284* (2020.01)
*G06F 16/33* (2019.01)
*G06F 40/295* (2020.01)

(52) U.S. Cl.
CPC ...... *G06F 16/3329* (2019.01); *G06F 16/3344* (2019.01); *G06F 40/284* (2020.01); *G06F 40/295* (2020.01)

(58) Field of Classification Search
CPC ............. G06F 16/3329; G06F 16/3344; G06F 40/284; G06F 40/295
See application file for complete search history.

(56) References Cited

U.S. PATENT DOCUMENTS

| | | | | |
|---|---|---|---|---|
| 5,794,177 | A * | 8/1998 | Cams | G06F 40/268 707/E17.084 |
| 6,684,370 | B1 * | 1/2004 | Sikorsky | G06F 40/103 715/205 |
| 2003/0191625 | A1 * | 10/2003 | Gorin | G06F 40/295 704/E15.022 |
| 2003/0212712 | A1 * | 11/2003 | Gu | G06F 16/10 |
| 2015/0348547 | A1 * | 12/2015 | Pau | G10L 15/197 704/251 |
| 2017/0132200 | A1 * | 5/2017 | Noland | G06Q 10/06 |
| 2017/0277667 | A1 * | 9/2017 | Weston | G06F 3/0482 |
| 2019/0140995 | A1 * | 5/2019 | Roller | G06F 40/295 |
| 2019/0333020 | A1 * | 10/2019 | Zhao | G06Q 10/107 |
| 2022/0261426 | A1 * | 8/2022 | Malak | G06F 3/0482 |

* cited by examiner

*Primary Examiner* — Eric Yen
(74) *Attorney, Agent, or Firm* — DLA Piper LLP (US)

(57) ABSTRACT

A processor may receive a plurality of text samples generated by a user and identify at least one variable text element in at least one of the plurality of text samples. The processor may tokenize the at least one variable text element, thereby producing a plurality of tokenized text samples including at least one token. The processor may build a longest common substring from the plurality of tokenized text samples and add the longest common substring and the at least one token to a set of selectable user interface options specific to the user. The processor may generate a user interface comprising the set of selectable user interface options. This can include detecting a user interface context and automatically replacing the at least one token with information specific to the user interface context within the set of selectable user interface options.

20 Claims, 8 Drawing Sheets

700

200

FIELD PRE-FILL SYSTEMS AND METHODS

BACKGROUND

One goal of user interface (UI) development is to improve the user experience by providing time-saving and/or value-added features. Improvements of this type can help keep users happy and reduce churn (the rate at which users adopt and subsequently abandon a software product). For online forms, user time savings could potentially be realized by pre-filling as much information as possible. For example, with invoicing, there are line items (e.g., name, description, other fields) which each might have different descriptions modified by context (e.g., a recurring purchase for January, the same recurring purchase for February, etc.).

BRIEF DESCRIPTIONS OF THE DRAWINGS

DETAILED DESCRIPTION OF SEVERAL EMBODIMENTS

Systems and methods described herein can automatically determine UI context and pre-fill relevant data into UI forms. This provides UI improvements, helps with client retention, saves time on invoicing, and reduces churn. Moreover, while pre-filling can be costly in terms of computing resources and latency, and does not necessarily capture context correctly, the disclosed embodiments include technical improvements that obviate these issues. For example, the disclosed embodiments can automatically create UI elements including pre-filled fields available for selection through processing performed prior to a user's interaction with the UI, thereby avoiding resource overload at runtime. Even so, these UI elements are specific to the real-time UI context.

Using the example of a UI for creating invoices as an example, some embodiments may function as follows. The invoice contains a section of line items which includes a brief free-text description for each item added to the invoice. In many cases, the description slightly changes between invoices, depending on the context, even for the same item. For example, for an invoice line item called "Landscaping", the description could be "Landscaping services for the month of January," "Landscaping services for the month of February," "Landscaping services for the month of March," etc., where the context is the date of the invoice. Additional examples may include "Landscaping services for John Doe," "Landscaping services for Scott Cook," etc., where the context is the name of the invoice recipient.

By using past descriptions of each item, systems and methods described herein can extract entities which tend to be interchangeable (such as the dates and names) and replace them with tokens. Then, exact date formats of interchangeable date parts and identities of names can be detected. Next, the "anchor" of the description which is most prominent across all of the descriptions can be identified. Finally, to construct a new line item description automatically at the time of the next invoice creation, context specific information (e.g., current date, name of invoice recipient, etc.) can be injected into the anchor in place of the tokens.

Figure 1:
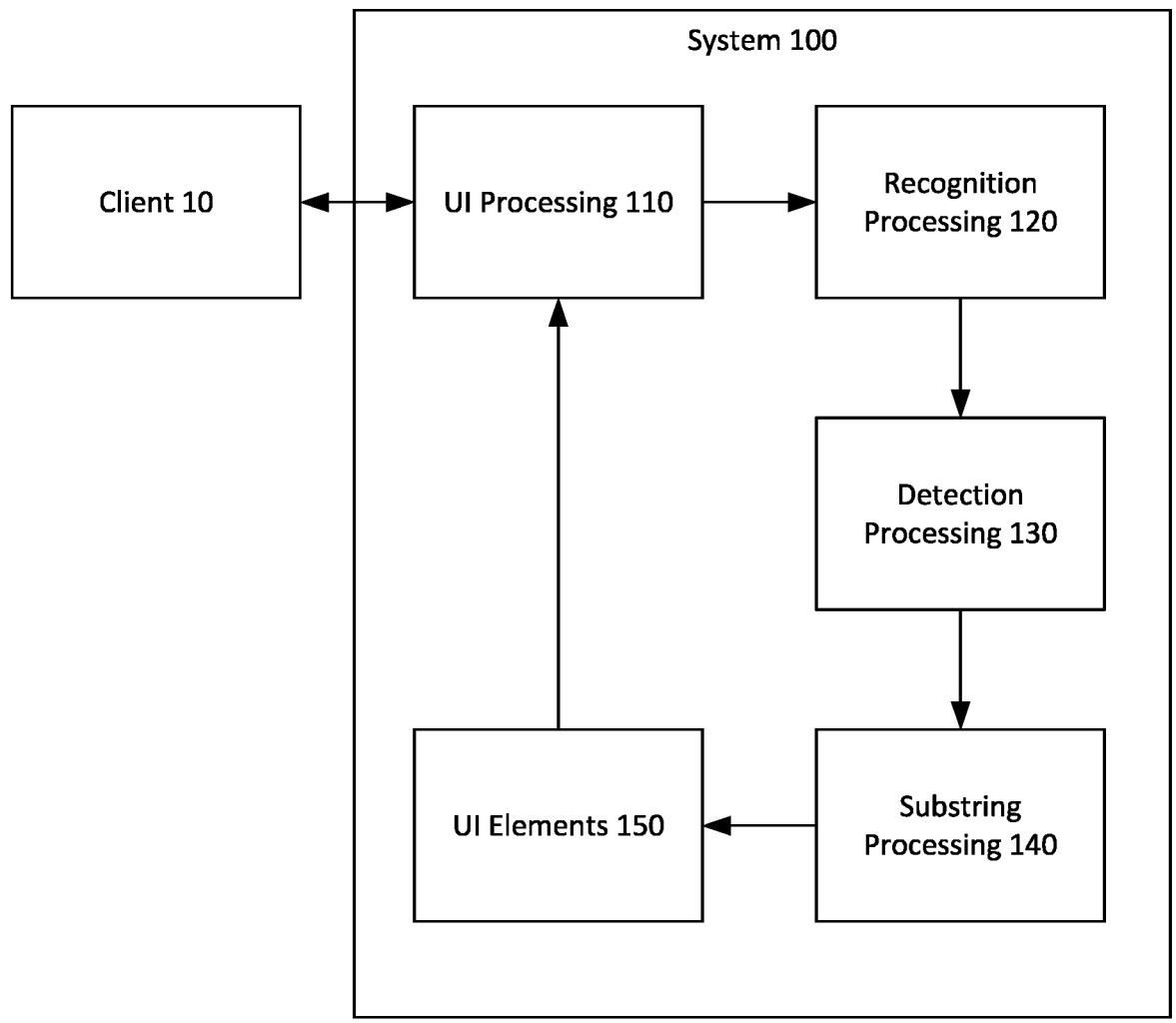
FIG. 1 shows an example field pre-fill system according to some embodiments of the disclosure.

FIG. 1 shows an example field pre-fill system 100 according to some embodiments of the disclosure. System 100 may include a variety of hardware, firmware, and/or software components that interact with one another. Some components may communicate with client(s) 10 through a network (e.g., the Internet, an intranet, and/or one or more networks that provide a cloud environment). Some components may communicate with one another using network 100. Each component may be implemented by one or more computers (e.g., as described below with respect to FIG. 8).

Client 10 can communicate with system 100, such as by interacting with a UI provided by UI processing 110 of system 100. The UI can include forms and/or fields with variable information. UI processing 110 can store entries made by users in the UI (e.g., data entered into fields, documents generated, etc.) and can determine the context of the UI from the data being presented and/or entered therein.

As described in detail below, system 100 can perform processing to build and store UI elements 150 including pre-filled, context specific information available at runtime. Recognition processing 120 can extract entities which tend to be interchangeable from fields and/or documents using Named Entity Recognition (NER) and/or other techniques and replace them with tokens. Detection processing 130 can detect the context of the interchangeable data using regular expression (RegEx) processing and/or other techniques. Substring processing 140 can detect common elements across all fields and/or documents using the Longest Common Substring (LCS) algorithm and/or other techniques. Thereafter, system 100 can create and store UI elements 150 that provide context-specific pre-filled selectable UI options which can be presented to client 10 by UI processing 110. For example, FIGS. 2-7 illustrate the functioning of the illustrated components in detail.

Elements illustrated in FIG. 1 (e.g., client 10 and/or system 100 including UI processing 110, recognition processing 120, detection processing 130, and/or substring processing 140) are each depicted as single blocks for ease of illustration, but those of ordinary skill in the art will appreciate that these may be embodied in different forms for different implementations. For example, while UI processing 110, recognition processing 120, detection processing 130, and substring processing 140 are depicted separately, any combination of these elements may be part of a combined hardware, firmware, and/or software element. Likewise, while UI processing 110, recognition processing 120, detection processing 130, and substring processing 140 are depicted as parts of a single system 100, any combination of these elements may be distributed among multiple logical and/or physical locations. Also, while one client 10 and one system 100 are illustrated, this is for clarity only, and multiples of any of the above elements may be present. In practice, there may be single instances or multiples of any of the illustrated elements, and/or these elements may be combined or co-located.

Figure 2:
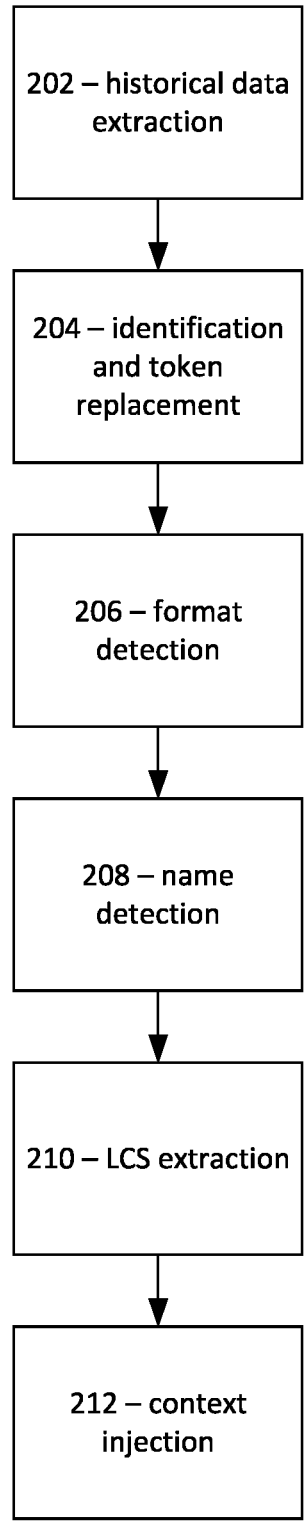
FIG. 2 shows an example pre-fill process according to some embodiments of the disclosure.

FIG. 2 shows an example pre-fill process 200 according to some embodiments of the disclosure. System 100 can perform process 200 to gather historical data, process it to determine and create appropriate UI elements 150 for one or more contexts, and provide the UI elements 150 in their given contexts.

At 202, system 100 can perform historical data extraction. For example, UI processing 110 can receive a plurality of text samples generated by a user. In some cases, UI processing 110 can record and store UI interactions from client 10 as they come in over time. In some cases, UI processing 110 can access a corpus of text samples stored in a memory.

System 100 (e.g., UI processing 110 and/or recognition processing 120) can extract historical data relevant to the UI element. Using an invoicing UI as an example, system 100 can extract historical data about user generated invoices. For each user, system 100 can utilize all invoices (e.g., all invoices generated in a given time period, or all invoices previously generated by the user, etc.), regardless of the recipient. The data can include line items (e.g., the items used within each invoice), the company that sent the invoice, the customer to which the invoice was sent, and the free-text description for each line item in the invoice, for example.

Figure 3:
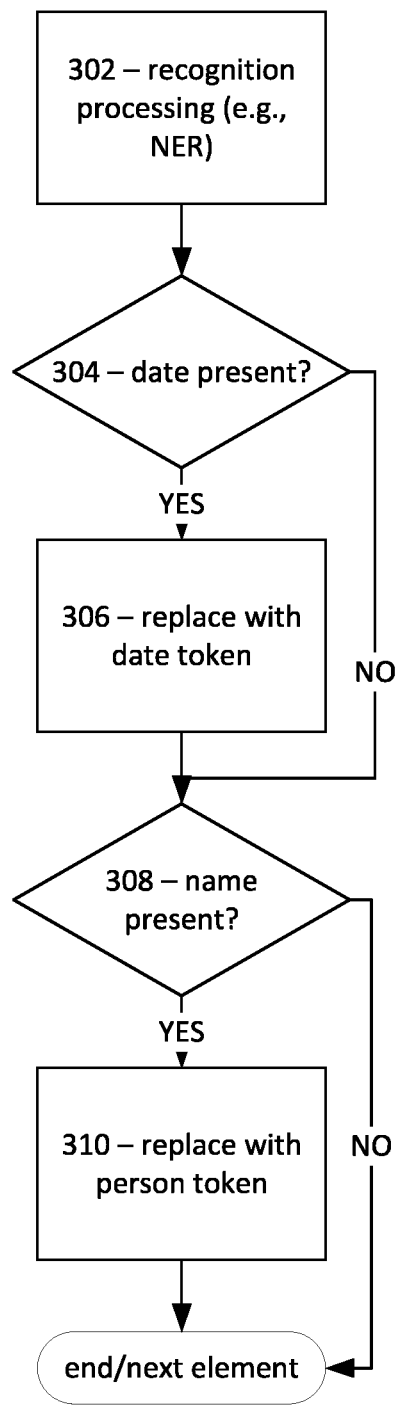
FIG. 3 shows an example identification and token replacement process according to some embodiments of the disclosure.

At 204, system 100 can perform identification and token replacement. Some kinds of information in a UI element can be context-specific and variable, such as a date or a name. System 100 can replace the variable information with one or more tokens, enabling replacement of the tokens with context-specific information during future runtime instances. System 100 may use proprietary or off-the-shelf algorithm(s) to perform such identification and token replacement. For example, FIG. 3 shows an example identification and token replacement process 300, using NER as the algorithm and an invoice UI for illustration, according to some embodiments of the disclosure.

At 302, recognition processing 120 can use NER to recognize the variable information. NER can identify content of the data obtained at 202 using a machine learning (ML) process. This can be a natural language processing (NLP) process trained to identify variable elements, such as dates, names, and/or combinations thereof in the present example. In some embodiments, the ML process may be a NER algorithm such as spaCy, NLTK, open NLP, etc. The ML process may use grammar-based rules to identify specific types of content. The ML process may use one or more models (e.g., supervised learning ML models) trained to identify one or more specific types of content. In some cases, recognition processing 120 may use bidirectional encoder representations from transformers (BERT) as an ML process for performing NER. For example, a BERT model can be trained to recognize dates, names, or any content of interest.

Using NER, recognition processing 120 thereby can identify at least one variable text element in at least one of the plurality of text samples. Once the at least one variable text element has been identified, recognition processing 120 can tokenize the at least one variable text element, thereby producing a plurality of tokenized text samples including at least one token.

For example, at 304, recognition processing 120 can determine whether the at least one variable text element comprises at least one date. If so, at 306, recognition processing 120 can replace the date with a <date> token. As described in detail below, when format detection is performed, <date> tokens can be further refined to have normalized date formats. Then, when context injection is performed at runtime, system 100 will be able to identify any dates that are present in a UI element 150 and replace them with context-specific dates having the normalized date format.

Similarly, at 308, recognition processing 120 can determine whether the at least one variable text element comprises at least one name. If the at least one variable text element comprises at least one name, at 310, recognition processing 120 can replace the name with a <person> token. As described in detail below, when context injection is performed at runtime, system 100 will be able to identify any <person> tokens that are present in a UI element 150 and replace them with context-specific names which may be provided by client 10 and/or located in the recipient database.

As an illustrative, non-limiting example, the NER model can detect which part of each invoice description contains a date or person name, and system 100 can replace this part of the description with the token <date> or <person>. For example, "Landscaping services for the month of January" can become "Landscaping services for the month of <date>." In another example, "Landscaping services for Kevin Duckworth" can become "Landscaping services for <person>." An example with both tokens can appear as follows: "Catering services for Oliver Miller on Apr. 6, 2022" which can become "Catering services for <person> on <date>."

Returning to FIG. 2, while process 200 includes identification and token replacement (e.g., using NER), some embodiments could omit this feature, instead relying on RegEx (described below) to detect the date and performing a keyword search for the name. Embodiments that include the identification and token replacement described above may realize accuracy improvements over embodiments that omit such processing.

Figure 4:
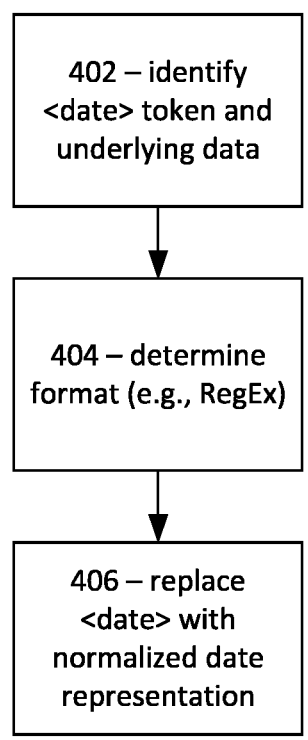
FIG. 4 shows an example format detection process according to some embodiments of the disclosure.

At 206, system 100 can perform format detection. Some kinds of tokenized data can have one of multiple possible formats. An example is a date that was detected at 204 and replaced by a <date> token. Dates can be written many ways, such as (month) (day), (year); (day) (month), (year); or subsets thereof. Moreover, months, days, and/or years can be expressed numerically or as words. FIG. 4 shows an example format detection process 400 according to some embodiments of the disclosure, wherein <date> tokens are replaced by normalized date representations that can later be modified according to context during context injection.

At 402, detection processing 130 can identify <date> tokens introduced at 204 and underlying data. Each text sample that has been modified to include a <date> token can be identified. The data that has been replaced by the <date> token can also be identified. Returning to the examples above, for "Landscaping services for the month of January," where <date> was inserted in place of "January," detection processing 130 can identify "January" and store it for subsequent processing. For "Catering services for Oliver Miller on Apr. 6, 2022," where <date> was inserted in place of "Apr. 6, 2022," detection processing 130 can identify "Apr. 6, 2022" and store it for subsequent processing.

At 404, detection processing 130 can determine the date format of the underlying data. For example, using one or more RegEx rules, detection processing 130 can infer the date format. For example, the date format of "January" can be inferred as "month," and the date format of "Apr. 6, 2022" can be inferred as "month, day, year." RegEx rules may be custom rules or may be standard rules available in Python libraries or the like.

At 406, detection processing 130 can replace <date> tokens with a normalized date representation. For example, "Landscaping services for the month of <date>" (where "January" was replaced by <date>) becomes "Landscaping services for the month of % B," where % B is the date format representation of a month's full name. "Catering services for <person> on Apr. 6, 2022" (where "Apr. 6, 2022" was replaced by <date>) becomes "Catering services for <person> on % M/% d/% y," where % M/% d/% y is the date format representation of alphabetic month/numeric day/numeric year. Detection processing 130 can store the text with normalized date representation for later processing.

Figure 5:
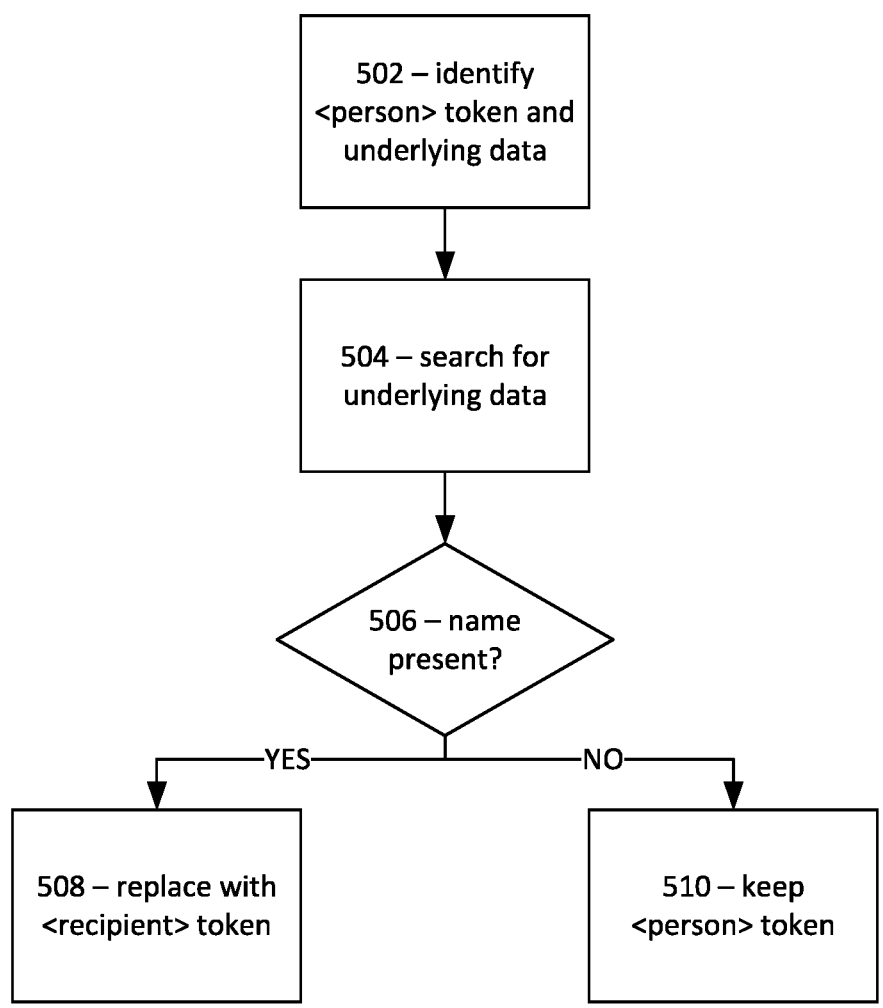
FIG. 5 shows an example name detection process according to some embodiments of the disclosure.

Returning to FIG. 2, at 208, system 100 can perform name detection. To form a fully integrated UI element 150, system 100 can determine whether a detected context-specific portion thereof should be associated with selectable text or free-form text. Continuing the invoice example for the purposes of illustration, selectable text can include a stored set of customer names that a user could pick from a drop-down menu or other UI element. Free-form text could correspond to a new customer for which an invoice is being created for the first time. For this specific example and for other use cases, system 100 can further tailor the UI element 150 through name detection. FIG. 5 shows an example name detection process 500 according to some embodiments of the disclosure.

At 502, detection processing 130 can identify <person> tokens introduced at 204 and underlying data. Each text sample that has been modified to include a <person> token can be identified. The data that has been replaced by the <person> token can also be identified. Returning to the examples above, for "Landscaping services for Kevin Duckworth," where <person> was inserted in place of "Kevin Duckworth," detection processing 130 can identify "Kevin Duckworth" and store it for subsequent processing. For "Catering services for Oliver Miller on Apr. 6, 2022," where <person> was inserted in place of "Oliver Miller," detection processing 130 can identify "Oliver Miller" and store it for subsequent processing.

At 504, detection processing 130 can search for the underlying data. Detection processing 130 can search a database of names available to system 100. In the invoicing UI example, this database may store names of customers of the user that have been invoiced in the past and saved by the user. Continuing the examples above, detection processing 130 can search the database for "Kevin Duckworth" and "Oliver Miller." In some embodiments, multiple searches can be attempted, such as a search for full names, a search for first names only, a search for last names only, etc.

At 506, detection processing 130 can determine whether one or more of the names are present in the results of the search or searches. If so, at 508, detection processing 130 can replace the <person> token with a different token (e.g., a <recipient> token) indicating that the underlying data is selectable from a preexisting list. For example, assume "Kevin Duckworth" was in the database and was found by the search at 504. In this case, "Landscaping services for <person>" can become "Landscaping services for <recipient>."

If any name is not present in the search results, at 510, detection processing 130 can maintain the original (e.g., <person>) token for the text. Thereafter, the <person> token indicates that the underlying data is not selectable and should be filled in the UI. For example, assume "Oliver Miller" was not in the database and was not found by the search at 504. In this case, "Catering services for <person> on % M/% d/% y" can remain unchanged.

Returning to FIG. 2, while process 200 includes format and name detection, the detection processing could be expanded to detect more elements in some embodiments. For example, process 200 could be modified to include processing to detect number detection (e.g., "sales for item unit #334"), replacing detected unit numbers with tokens (e.g., #334 becomes <unit_name> or <item>). In some embodiments, system 100 can be configured to detect and tokenize any data of interest.

Figure 6:
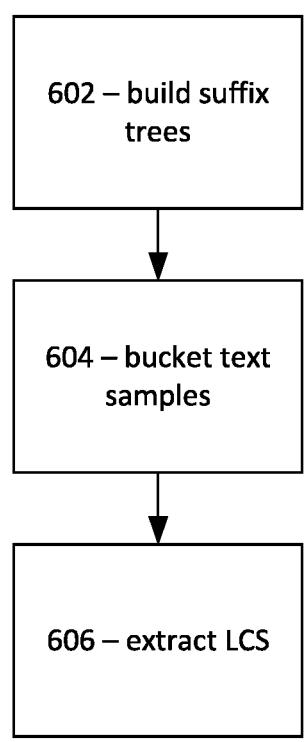
FIG. 6 shows an example least common substring extraction process according to some embodiments of the disclosure.

At 210, system 100 can perform LCS extraction. LCS extraction can generate the fixed portion of the UI element 150 by identifying common elements in the text samples and basing the fixed portion thereon. LCS extraction gives at least the technical advantage of customizing a UI to a given user and/or context without requiring storage of custom user and/or context data. FIG. 6 shows an example LCS extraction process 600 according to some embodiments of the disclosure. Substring processing 140 can perform process 600, thereby building an LCS from the plurality of tokenized text samples by identifying a plurality of common substrings in the plurality of tokenized text samples and selecting a most frequent one of the plurality of common substrings as the LCS.

At 602, substring processing 140 can create respective suffix trees for each tokenized text sample. A suffix tree is a tree containing all suffixes of a given text as keys and positions in the text as their values. A proprietary or off-the-shelf algorithm for generating suffix trees can be used. Substring processing 140 can apply the algorithm to each text sample and store the resulting suffix trees.

At 604, substring processing 140 can bucket the plurality of tokenized text samples and/or suffix trees thereof. After processing at 204-208, it may be the case that the text that has not been replaced by tokens differs among some or all of the text samples. Using the invoicing example to illustrate, a set of text samples could include the following:

1. "Landscaping services for <person> for the month of % B, thanks."
2. "Landscaping services for <recipient> for the month of % B."
3. "Landscaping services for <recipient> for the month of % B."
4. "Landscaping services for % d/% M/% Y."

Substring processing 140 can group the text samples into buckets according to length, for example by grouping together text samples having same length suffix trees. In the simple example above, samples 2 and 3 will go into the same bucket, while samples 1 and 4 will go to different respective buckets. In situations where all text samples are of the same length, only a single bucket is formed, or the bucketing may be omitted.

At 606, substring processing 140 can extract the LCS. For example, substring processing 140 can extract the text associated with the bucket having the most entries therein (e.g., the most common bucket and therefore most common substring). In some embodiments, if there are multiple buckets with same or similar numbers of entries, the text associated with the bucket with the smaller suffix tree can be selected. Substrings can also be selected on the basis of length, such that the text associated with the bucket with the smallest suffix tree can be selected regardless of how many entries are inside respective buckets. Alternative selection criteria are possible. In any event, a single text sample can be representative and can be used as the basis for the selectable UI element 150. Substring processing 140 can store the extracted LCS as the fixed text portion of UI element 150, with the associated tokens stored as the variable portion(s) of UI element 150. Substring processing 140 can add the UI element 150 (including the LCS and the at least one token) to a set of selectable user interface options specific to the user from whom the text samples were obtained.

Figure 7:
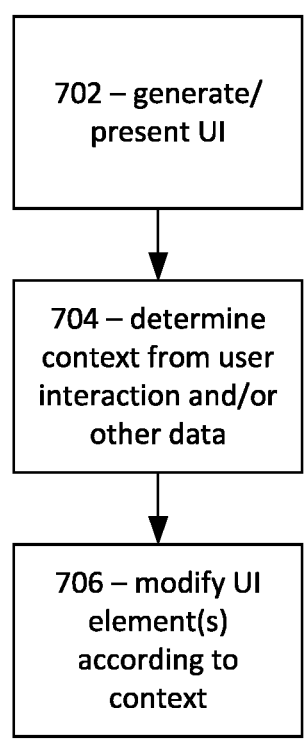
FIG. 7 shows an example context injection process according to some embodiments of the disclosure.

Returning to FIG. 2, at 212, system 100 can perform context injection. Context injection is a runtime process whereby system 100 can incorporate runtime context into UI elements 150 to automatically build out portions of the UI. FIG. 7 shows an example context injection process 700 according to some embodiments of the disclosure.

At 702, UI processing 110 can generate and/or present a UI to client 10. For example, the user can log into a software product hosted by system 100 and/or another computer using client 10. Upon login by the user, UI processing 110 can determine user-specific data that can be made available in the UI, such as user account information, previous work started by the user and saved in memory, etc. UI processing 110 can generate or otherwise cause client 10 to display a UI including a set of selectable user interface options (e.g., including one or more UI elements 150).

At 704, UI processing 110 can determine context from user interactions with the UI through client 10 and/or from other data. Specifically, UI processing 110 can determine information specific to the UI context, such as information received from the user by the UI. In the invoicing example, such information can include a customer name of a new customer entered into a field, or a customer selected or selectable from a list of preexisting customers. Additionally or alternatively, information specific to the UI context can include information not entered by the user, such as a current time or date obtained from a system 100 clock or the like. Any information that is specific to the current context of the UI, whether user entered or sourced by some UI process, can be part of the context determined by UI processing 110.

At 706, UI processing 110 can modify one or more UI elements 150 according to the context determined at 704. UI processing 110 can automatically replace the at least one token with information specific to the UI context within the set of selectable user interface options. For example, in an accounting application, the context and the LCS may be translated into an invoice by built-in invoice generating capabilities already present in the accounting application. In another example, in a spreadsheet application, the context and the LCS may populate a spreadsheet formed according to the built-in sheet generating capabilities already present in the spreadsheet application.

For example, upon the creation of a new invoice by the user, system 100 can consider the item and reconstruct the description by using the LCS template constructed for that item. System 100 can inject context into each description (e.g., the current month, recipient, etc.) in their token placeholders. For example, if the current date detected by system 100 is Apr. 6, 2022, the recipient name entered by the user is Oliver Miller, and the LCS is "Catering services for <recipient> on % d/% M/% Y," the automatically-generated UI element 150 is "Catering services for Oliver Miller on Apr. 6, 2022."

Figure 8:
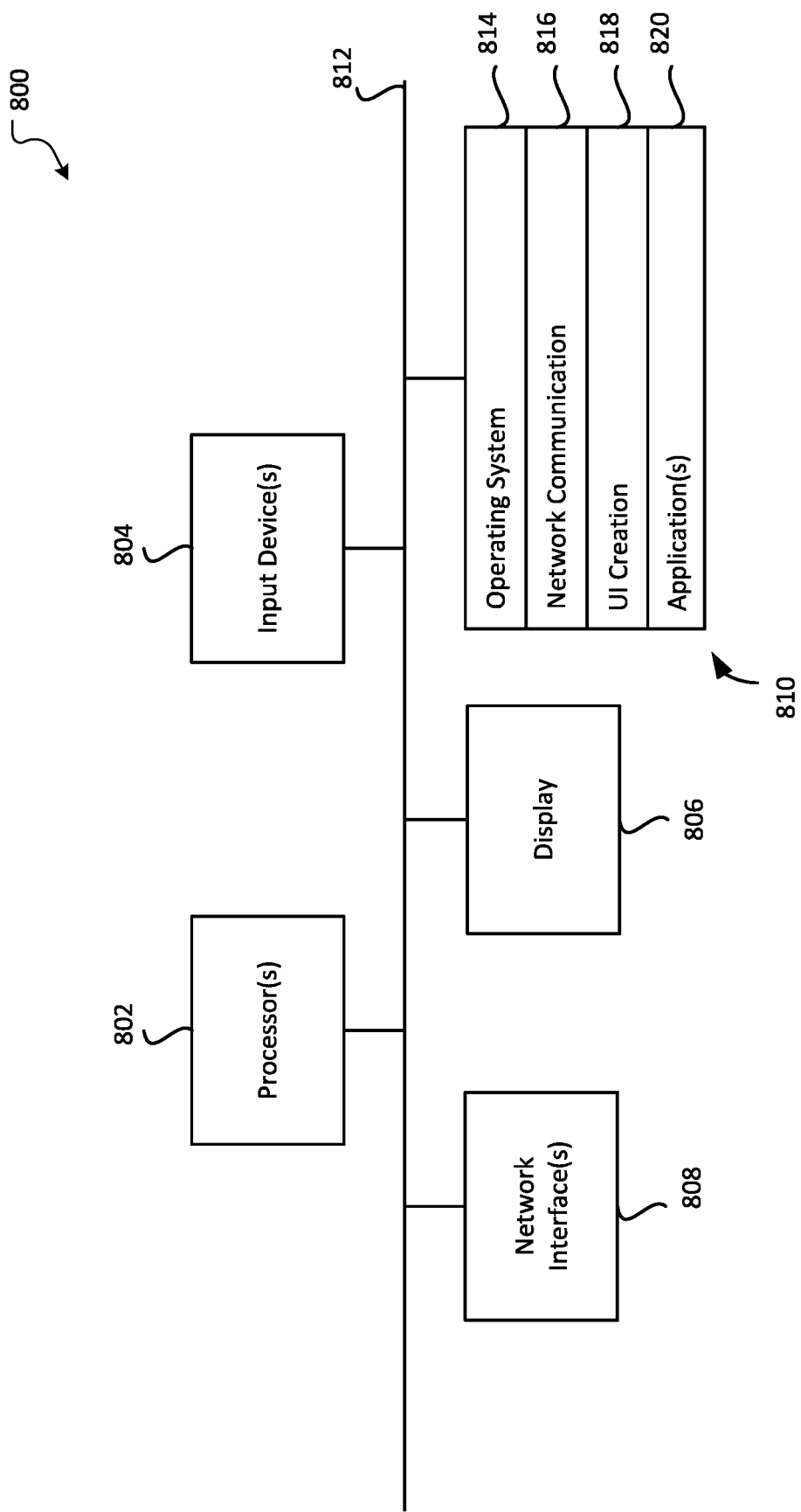
FIG. 8 shows a computing device according to some embodiments of the disclosure.

FIG. 8 shows a computing device 800 according to some embodiments of the disclosure. For example, computing device 800 may function as system 100 or any portion(s) thereof, or multiple computing devices 800 may function as system 100.

Computing device 800 may be implemented on any electronic device that runs software applications derived from compiled instructions, including without limitation personal computers, servers, smart phones, media players, electronic tablets, game consoles, email devices, etc. In some implementations, computing device 800 may include one or more processors 802, one or more input devices 804, one or more display devices 806, one or more network interfaces 808, and one or more computer-readable mediums 810. Each of these components may be coupled by bus 812, and in some embodiments, these components may be distributed among multiple physical locations and coupled by a network.

Display device 806 may be any known display technology, including but not limited to display devices using Liquid Crystal Display (LCD) or Light Emitting Diode (LED) technology. Processor(s) 802 may use any known processor technology, including but not limited to graphics processors and multi-core processors. Input device 804 may be any known input device technology, including but not limited to a keyboard (including a virtual keyboard), mouse, track ball, and touch-sensitive pad or display. Bus 812 may be any known internal or external bus technology, including but not limited to ISA, EISA, PCI, PCI Express, NuBus, USB, Serial ATA or FireWire. In some embodiments, some or all devices shown as coupled by bus 812 may not be coupled to one another by a physical bus, but by a network connection, for example. Computer-readable medium 810 may be any medium that participates in providing instructions to processor(s) 802 for execution, including without limitation, non-volatile storage media (e.g., optical disks, magnetic disks, flash drives, etc.), or volatile media (e.g., SDRAM, ROM, etc.).

Computer-readable medium 810 may include various instructions 814 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 804; sending output to display device 806; keeping track of files and directories on computer-readable medium 810; controlling peripheral devices (e.g., disk drives, printers, etc.) which can be controlled directly or through an I/O controller; and managing traffic on bus 812. Network communications instructions 816 may establish and maintain network connections (e.g., software for implementing communication protocols, such as TCP/IP, HTTP, Ethernet, telephony, etc.).

UI creation 818 may include the system elements and/or the instructions that enable computing device 800 to perform the processing of system 100 as described above. Application(s) 820 may be an application that uses or implements the outcome of processes described herein and/or other processes. For example, application(s) 820 may incorporate the UI and/or UI elements 150 created by system 100 as described above. In some embodiments, the various processes may also be implemented in operating system 814.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   receiving, by a processor, a plurality of text samples generated by a user;
   identifying, by the processor, at least one variable text element in at least one of the plurality of text samples;
   tokenizing, by the processor, the at least one variable text element, thereby producing a plurality of tokenized text samples including at least one token;
   building, by the processor, a longest common substring from the plurality of tokenized text samples;
   adding, by the processor, the longest common substring and the at least one token to a set of selectable user interface options specific to the user;
   generating, by the processor, a user interface;
   detecting, by the processor, a user interface context;
   automatically replacing, by the processor, the at least one token with information specific to the user interface context within the set of selectable user interface options; and
   displaying, by the processor, the set of selectable user interface options in the user interface.

2. The method of claim 1, wherein the identifying comprises detecting, using a named entity recognition model, at least one date, at least one name, or a combination thereof as the at least one variable text element.

3. The method of claim 1, wherein:
   the at least one variable text element comprises at least one date; and
   the tokenizing comprises configuring the at least one token to have a normalized date format.

4. The method of claim 1, wherein:
the at least one variable text element comprises at least one name; and
the tokenizing comprises performing a search of a recipient database and selecting a token type for the at least one token based on whether the at least one name is included in a result of the search.

5. The method of claim 1, wherein the building comprises:
identifying a plurality of common substrings in the plurality of tokenized text samples; and
selecting a most frequent one of the plurality of common substrings as the longest common substring.

6. The method of claim 1, wherein the information specific to the user interface context includes information received from the user by the user interface.

7. A method comprising:
receiving, by a processor, a plurality of text samples generated by a user;
identifying, by the processor, at least one variable text element in at least one of the plurality of text samples;
tokenizing, by the processor, the at least one variable text element, thereby producing a plurality of tokenized text samples including at least one token;
building, by the processor, a longest common substring from the plurality of tokenized text samples;
adding, by the processor, the longest common substring and the at least one token to a set of selectable user interface options specific to the user; and
generating, by the processor, a user interface comprising the set of selectable user interface options.

8. The method of claim 7, wherein the identifying comprises detecting, using a named entity recognition model, at least one date, at least one name, or a combination thereof as the at least one variable text element.

9. The method of claim 7, wherein:
the at least one variable text element comprises at least one date; and
the tokenizing comprises configuring the at least one token to have a normalized date format.

10. The method of claim 7, wherein:
the at least one variable text element comprises at least one name; and
the tokenizing comprises performing a search of a recipient database and selecting a token type for the at least one token based on whether the at least one name is included in a result of the search.

11. The method of claim 7, wherein the building comprises:
identifying a plurality of common substrings in the plurality of tokenized text samples; and
selecting a most frequent one of the plurality of common substrings as the longest common substring.

12. The method of claim 7, further comprising:
detecting, by the processor, a user interface context; and
automatically replacing, by the processor, the at least one token with information specific to the user interface context within the set of selectable user interface options.

13. The method of claim 12, wherein the information specific to the user interface context includes information received from the user by the user interface.

14. A system comprising:
a non-transitory memory; and
a processor in communication with the non-transitory memory and being configured to perform processing comprising:
receiving a plurality of text samples generated by a user;
identifying at least one variable text element in at least one of the plurality of text samples;
tokenizing the at least one variable text element, thereby producing a plurality of tokenized text samples including at least one token;
building a longest common substring from the plurality of tokenized text samples;
adding the longest common substring and the at least one token to a set of selectable user interface options specific to the user in the non-transitory memory; and
generating a user interface comprising the set of selectable user interface options.

15. The system of claim 14, wherein the identifying comprises detecting, using a named entity recognition model, at least one date, at least one name, or a combination thereof as the at least one variable text element.

16. The system of claim 14, wherein:
the at least one variable text element comprises at least one date; and
the tokenizing comprises configuring the at least one token to have a normalized date format.

17. The system of claim 14, wherein:
the at least one variable text element comprises at least one name; and
the tokenizing comprises performing a search of a recipient database in the non-transitory memory and selecting a token type for the at least one token based on whether the at least one name is included in a result of the search.

18. The system of claim 14, wherein the building comprises:
identifying a plurality of common substrings in the plurality of tokenized text samples; and
selecting a most frequent one of the plurality of common substrings as the longest common substring.

19. The system of claim 14, wherein the processing further comprises:
detecting a user interface context; and
automatically replacing the at least one token with information specific to the user interface context within the set of selectable user interface options.

20. The system of claim 19, wherein the information specific to the user interface context includes information received from the user by the user interface.

* * * * *